(12) United States Patent
Lu (10) Patent No.: US 12,189,985 B2
(45) Date of Patent: Jan. 7, 2025

(54) MEMORY CONTROLLERS AND OPERATING METHODS THEREOF, MEMORY SYSTEMS, AND ELECTRONIC DEVICES

(71) Applicant: Yangtze Memory Technologies Co., Ltd., Hubei (CN)

(72) Inventor: Zhenran Lu, Hubei (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 34 days.

(21) Appl. No.: 18/148,929

(22) Filed: Dec. 30, 2022

(65) Prior Publication Data

US 2024/0160381 A1    May 16, 2024

(30) Foreign Application Priority Data

Nov. 16, 2022    (CN) .......................... 202211472535.X (51) Int. Cl.
*G06F 3/06* (2006.01)
(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
See application file for complete search history.

(56) References Cited

U.S. PATENT DOCUMENTS

| | | | |
|---|---|---|---|
| 2007/0016719 A1* | 1/2007 | Ono | G06F 12/0804 711/E12.04 |
| 2010/0235579 A1* | 9/2010 | Biles | G06F 12/127 711/E12.001 |
| 2017/0255556 A1* | 9/2017 | Peng | G06F 12/126 |

\* cited by examiner

*Primary Examiner* — Gurtej Bansal
(74) *Attorney, Agent, or Firm* — Hanley, Flight & Zimmerman, LLC (57) ABSTRACT

Disclosed in implementations of the present disclosure include memory controllers and operating methods thereof, memory systems, and electronic devices. The memory controller is coupled to a memory. In one example, the operating method includes: determining whether write commands for the memory are continuous, and generating a first determination result; and entering a bypass write mode when the first determination result indicates that the write commands are continuous, wherein, in the bypass write mode, the memory controller updates a first mapping relationship between a logical address and a physical address of buffered data. Other examples are disclosed.

20 Claims, 4 Drawing Sheets

MEMORY CONTROLLERS AND OPERATING METHODS THEREOF, MEMORY SYSTEMS, AND ELECTRONIC DEVICES

RELATED APPLICATIONS

This application claims priority to and the benefit of Chinese Patent Application No. 202211472535.X, filed on Nov. 16, 2022, which is hereby incorporated by reference in its entirety.

TECHNICAL FIELD

Implementations of the present disclosure relate to integrated circuits, and in particular to a memory controllers and operating methods thereof, memory systems, and electronic devices.

BACKGROUND

One memory (or a plurality of memories) and a memory controller can be integrated into various types of memory devices such as a Solid State Drive (SSD), a Universal Flash Storage (UFS), an embedded Multi-Media Card (eMMC), and the like.

The memory controller can perform logical operations such as a read operation, a write operation, an erase operation, and the like on the memory based on received operation commands. The memory controller can also drive firmware (FW) configured to perform logical operations to control corresponding logical operations.

As memory integration and bit density increase, more data can be stored in a memory. However, in the process of storing data into the memory, corresponding logical operations (that is, write operations) become increasingly complex, resulting in an increase in overhead for a memory controller to execute firmware.

DETAILED DESCRIPTION

The technical solutions of the present disclosure are further described below in detail with reference to the accompanying drawings and the implementations described herein. The example implementation methods of the present disclosure are shown in the accompanying drawings. However, it should be understood that the present disclosure may be implemented in various forms, and should not be construed as being limited to the implementations set forth herein. Rather, these implementations are provided so that the present disclosure will be understood more thoroughly, and can fully convey the scope of the present disclosure to a person skilled in the art.

The present disclosure is described more specifically by way of examples in the following paragraphs with reference to the accompanying drawings. The advantages and features of the present disclosure will become clearer in light of the following description and claims. It should be noted that the accompanying drawings are in a very simplified form and are in a non-precise scale, and are used only to facilitate and clarify the purpose of describing the implementations of the present disclosure.

The terms such as "first", "second", "third", and the like in the implementations of the present disclosure are only used to distinguish between similar objects, but are not used to describe a specific order or time sequence.

It should be noted that the technical solutions recorded in the implementations of the present disclosure can be combined with each other in any combination without conflict.

Figure 1:
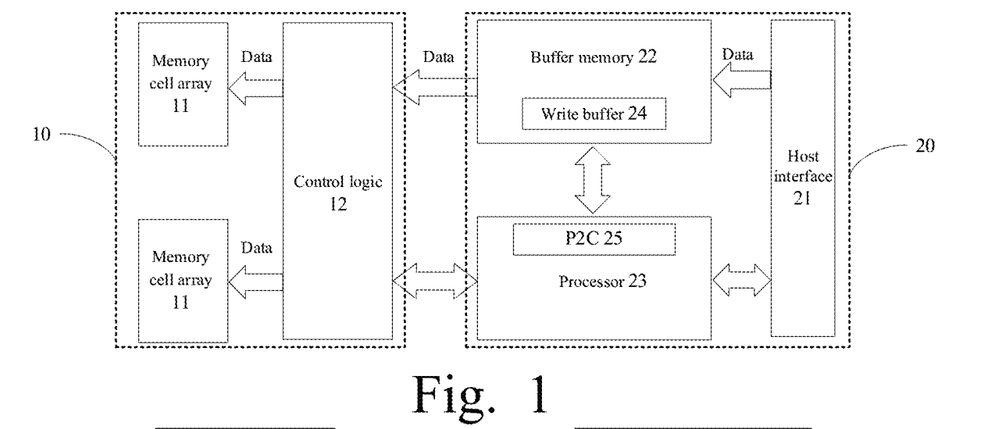
FIG. 1 is a schematic diagram of a memory device according to an example implementation.

FIG. 1 is a schematic diagram of a memory device according to an example implementation. Referring to FIG. 1, the memory device includes a memory 10. The memory 10 includes a memory cell array 11 and a peripheral circuit coupled to the memory cell array 11. The memory cell array includes a plurality of memory cells. The peripheral circuit includes a control logic 12. The memory 10 may be a NOR flash memory, a NAND flash memory or another type of memory.

The memory device further includes a memory controller 20 coupled to the memory 10. The memory controller 20 is configured to control an operation on the memory 10. For example, the memory 10 may be controlled by the memory controller 20 to perform an operation such as a read operation, a write operation, an erase operation, or the like. The memory controller 20 includes a host interface 21, a buffer memory 22, and a processor 23.

The host interface 21 is configured to couple the memory controller 20 to a host (not shown in the figure), and communicates with the host. The buffer memory 22 is configured to temporarily store data. The buffer memory 22 may include, but not limited to, a magnetoresistive random access memory (MRAM). For example, at least part of a memory space of the MRAM may be used as a write buffer 24. The write buffer 24 is configured to temporarily store data to be written into the memory 10. The processor 23 is configured to control overall operations of the memory controller 20. More specifically, the processor 23 may drive firmware to control the overall operations of the memory controller 20 to implement various functions of the memory controller. For example, the firmware includes a program to cache (P2C) 25. The P2C is an algorithm for maintaining logical relationship information between a buffer address and a physical address of unwritten data in the firmware. The P2C is described below.

In a write process of writing data into the memory 10 by the host, the data is first buffered into the write buffer 24, and the data is simultaneously written into the memory 10 when the data is buffered up to a certain data amount. The certain data amount here is usually denoted as a write window size. The write window size may be a total sum of sizes of written data indicated by a plurality of write commands, or the size of written data indicated by one write command, or part of the size of written data indicated by one write command. The write process is further described below in detail with reference to FIG. 2.

Figure 2:
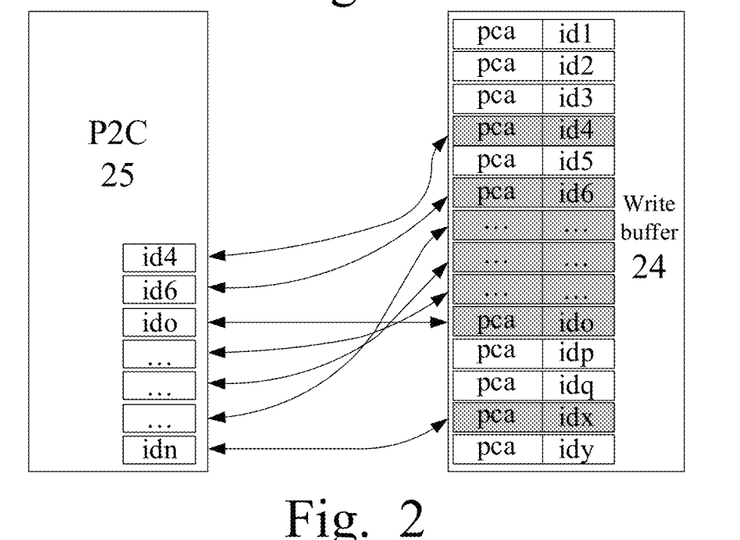
FIG. 2 is a schematic diagram of a write process of a memory device according to an example implementation.

FIG. 2 is a schematic diagram of a write process of a memory device according to an example implementation. Referring to FIG. 2, the write buffer 24 includes a plurality of write buffer areas. Each write buffer area is configured to buffer unit write data (for example, 4 KB). Here, data from the host may be divided into a plurality of pieces of unit write data, which are respectively buffered into the plurality of write buffer areas. The plurality of write buffer areas respectively correspond to a plurality of buffer addresses (buffer id), for example, id1, id2, id3, . . . , idx, and idy.

After the data has been buffered into the plurality of write buffer areas and before the data has been written into the memory, the firmware needs to maintain logical relationship information between a buffer address and a physical address (pca) of data all the time. For example, the P2C in the firmware updates and maintains the logical relationship information between a buffer address and a physical address of data in real time. Here, the physical address represents an address of the data in the memory.

After data of at least one write window size has been written into the memory, the firmware establishes a mapping relationship between a logical address and a physical address of the written data, releases (that is, deletes) logical relationship information of the written data, and continues to maintain logical relationship information of unwritten data. Here, the logical address represents an address of the data in the host. For example, data represented by buffer addresses id4, id6, . . . , ido, and idx and buffered in write buffer areas has not been written into the memory, and the P2C in the firmware needs to maintain corresponding logical relationship information all the time, as shown in FIG. 2.

As discussed above, the P2C is an algorithm for maintaining logical relationship information between a buffer address and a physical address of unwritten data in the firmware. The P2C will perform an update once the host sends a piece of new data. Therefore, during the execution of continuous write operations, the logical relationship information maintained in the P2C is updated in real time.

However, logical relationship information updated and maintained in the P2C each time is not always valid information. For example, the function of the P2C is effective only when a read command of the host hits logical relationship information maintained in the P2C, that is, data that the host intends to read is right buffered in a write buffer. For continuous write operations, logical relationship information updated and maintained in the P2C each time is almost invalid information. Only logical relationship information that was last buffered in a write buffer and has not been written in a memory is valid information. As a result, overhead of firmware increase s significantly, and write performance cannot be improved.

Here, the invalid information represents logical relationship information between a buffer address and a physical address of written data, and the valid information represents logical relationship information between a buffer address and a physical address of unwritten data.

In view of this, the implementations of the present disclosure provide an operating method of a memory controller.

Figure 3:
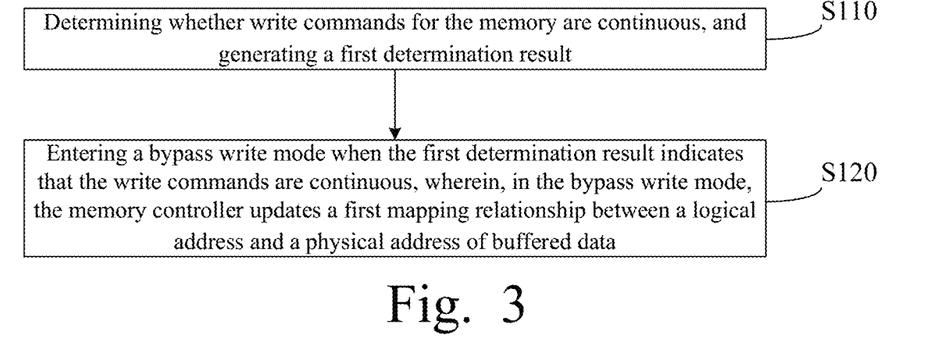
FIG. 3 is a flowchart of an operating method of a memory controller according to an implementation of the present disclosure.

FIG. 3 is a flowchart of an operating method of a memory controller according to an implementation of the present disclosure. The memory controller is coupled to a memory. Referring to FIG. 3, the operating method at least includes the following:

S110: Determining whether write commands for the memory are continuous, and generating a first determination result.

S120: Entering a bypass write mode when the first determination result indicates that the write commands are continuous, where in the bypass write mode, the memory controller updates a first mapping relationship between a logical address and a physical address of buffered data.

The memory controller is coupled to the memory. The memory controller may be configured to control operations of the memory, for example, a read operation, an erase operation, a write operation, and the like. The memory controller is further coupled to a host, and communicate with a host. For example, the memory controller writes data sent by the host into the memory in response to a write command of the host, or reads data stored in the memory into the host in response to a read command of the host.

In S110, a host interface may determine, according to types and the number of received operation commands, whether the write commands for the memory are continuous. When the write commands for the memory are continuous, the host interface sends first instruction information to a processor. When the write commands for the memory are not continuous, the host interface sends second instruction information to the processor. The first determination result includes the first instruction information and the second instruction information.

In S120, when the first determination result indicates that the write commands are continuous, that is, the processor receives the first instruction information, the memory controller enters the bypass write mode. More specifically, firmware loaded by the memory controller enters the bypass write mode. Here, the firmware is loaded to the memory controller upon power-up. In an example, the firmware is stored in the memory controller. In another example, the firmware is stored in the memory.

In the bypass write mode, the memory controller first buffers data from the host to a write buffer, the data buffered in the write buffer is written into the memory upon the data is buffered up to a certain data amount, and the firmware updates the first mapping relationship between the logical address and the physical address of the buffered data. That is, in the bypass write mode, the logical relationship information maintained in the P2C is no longer updated in real time.

In the implementations of the present disclosure, it is determined whether write commands for a memory are continuous, and a determination result is generated. A bypass write mode is entered if the determination result indicates that the write commands are continuous. In the bypass write mode, a memory controller only needs to update a first mapping relationship between a logical address and a physical address of buffered data, and no longer needs to maintain logical relationship information between a buffer address and a physical address of data all the time, that is, the P2C no longer needs to perform an update in real time, so that overhead for the memory controller to execute firmware can be reduced, thereby improving write performance.

Figure 4:
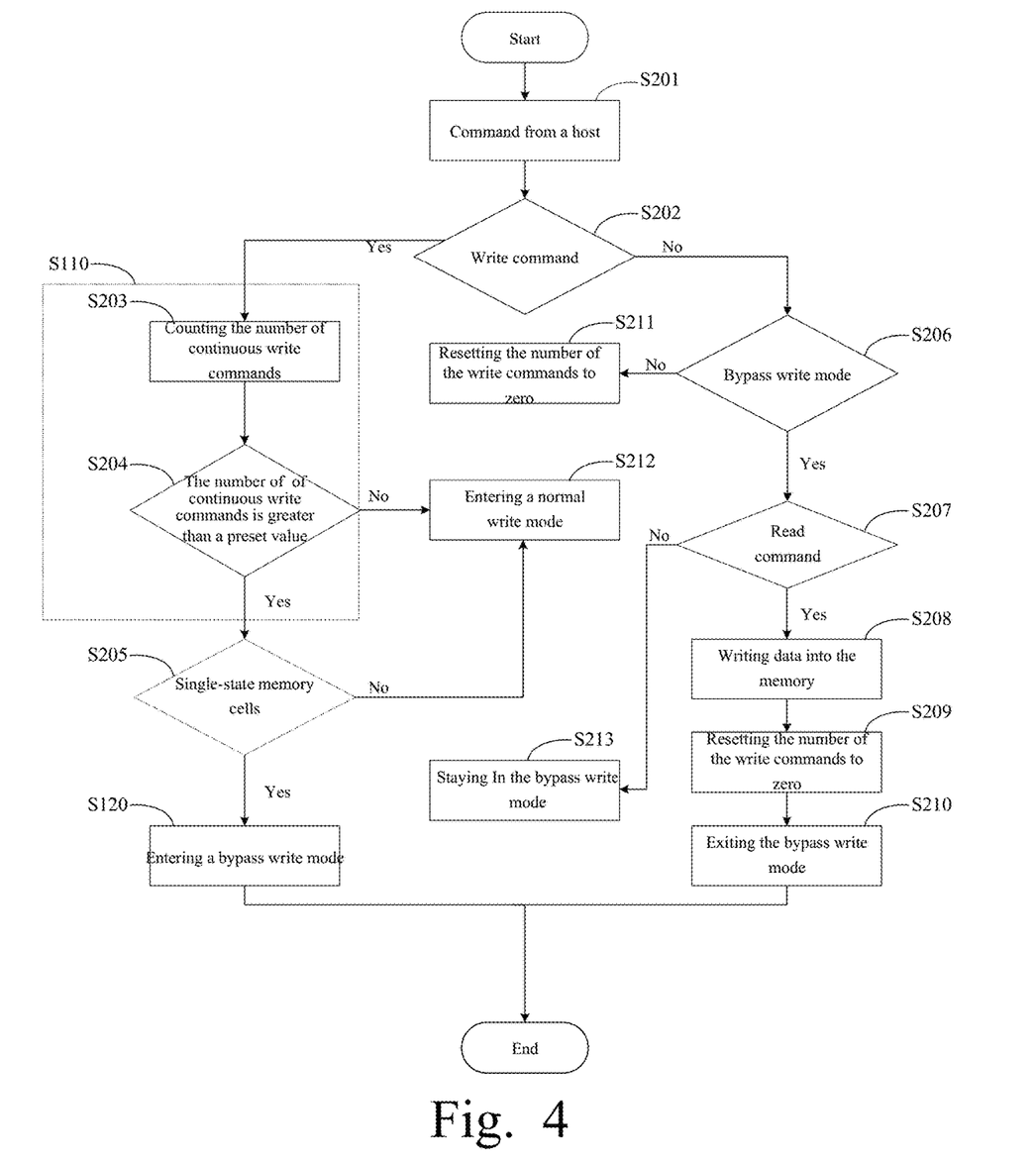
FIG. 4 is a schematic flowchart of an operating process of a memory controller according to an implementation of the present disclosure.
Figure 5:
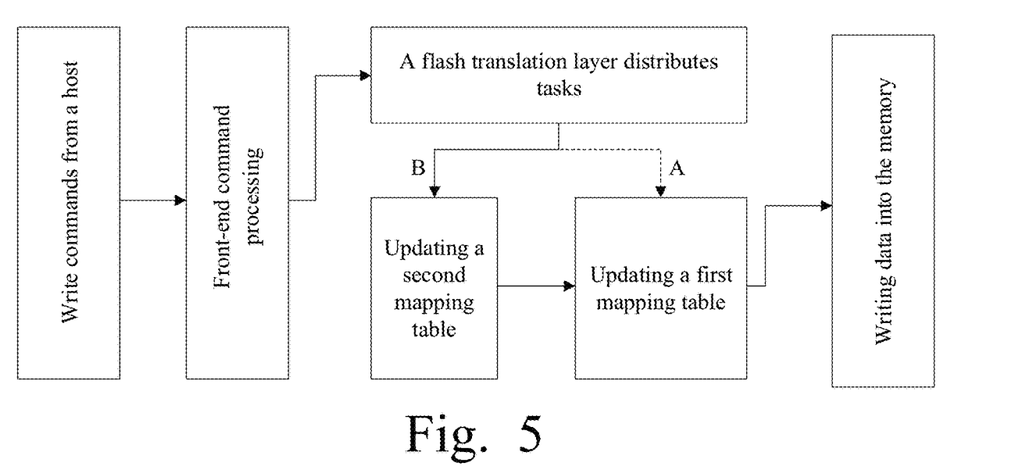
FIG. 5 is a schematic block diagram of an operating process of a memory controller according to an implementation of the present disclosure.

FIG. 4 is a schematic flowchart of an operating process of a memory controller according to an implementation of the present disclosure. FIG. 5 is a schematic block diagram of an operating process of a memory controller according to an implementation of the present disclosure. The operating method of a memory controller provided in the implementations of the present disclosure is described below in detail with reference to FIG. 3, FIG. 4, and FIG. 5.

Referring to FIG. 4, S202: determining whether a write command is received.

The memory controller may receive an operation command from the host (that is, S201), and parses the operation command to determine a type of the operation command. When determining that the operation command is a write command, the memory controller performs S110. When determining that the operation command is not a write command, the memory controller performs S206. Here, one or more operation commands may come from the host.

During actual application, the memory controller may receive an operation command from the host, and add the operation command to an interface queue. Operation commands in the interface queue may be performed in a sequential order or performed in a hybrid manner (for example, in parallel).

Referring to FIG. 4, when it is determined that the operation command is a write command, S110 is performed: determining whether write commands for the memory are continuous, and generating a first determination result.

In an example, if the host interface receives n operation commands from the host, and the n operation commands are all write commands, then it will be determined that the write commands for the memory are continuous, and the host interface will send the first instruction information to the processor. It can be understood that in this example, the host only sends write commands to the memory controller, n being a positive integer greater than 1.

In an example, if the host interface receives n operation commands from the host, the n operation commands include a plurality of continuous write commands, and the number m of the plurality of write commands is greater than a preset value, then it will be determined that the write commands for the memory are continuous, and the host interface will send the first instruction information to the processor. It can be understood that in this example, the host sends write commands and other operation commands (for example, read commands or erase commands) to the memory controller. Here, the other operation commands are sent before or after the plurality of continuous write commands, where m is a positive integer and is less than n. The preset value is described below in detail.

In an example, if the host interface receives n operation commands from the host, the n operation commands include a plurality of continuous write commands, and the number m of the plurality of write commands is less than or equal to the preset value, then it will be determined that the write commands for the memory are not continuous, and the host interface will send the second instruction information to the processor. It can be understood that in this example, the host sends operation commands of different types to the memory controller, and the plurality of operation commands include a plurality of continuous write commands. However, the number m of the plurality of continuous write commands is less than or equal to the preset value.

In an example, if the host interface receives n operation commands from the host, and the n operation commands include discontinuous write commands, then it will be determined that the write commands for the memory are not continuous, and the host interface will send the second instruction information to the processor. It can be understood that in this example, the host sends operation commands of different types to the memory controller, and the plurality of operation commands do not include continuous write commands.

In some implementations, the foregoing S110 includes: determining that the write commands are continuous when the number of the write commands for the memory is greater than the preset value.

Referring to FIG. 4, when it is determined that the operation command is a write command, S203 and S204 are performed: counting the number of continuous write commands; and determining whether the number of continuous write commands is greater than the preset value. For example, the number of continuous write commands in the interface queue is counted, and a count value is generated, and the count value is compared with the preset value. When the count value is greater than the preset value, S120 is performed. When the count value is less than or equal to the preset value, S212 is performed.

It needs to be noted that in S203, the number of continuous write commands in the interface queue is counted. For example, when the interface queue includes a first write command, a first read command, a second write command, a third write command, and a fourth write command that are sequentially queued, the count value is 3. In another example, when the interface queue includes a first write command, a second write command, a third write command, and a fourth write command that are sequentially queued, the count value is 4.

Here, the first write command, the first read command, the second write command, the third write command, and the fourth write command are only schematic, and are used to convey the present disclosure to a person skilled in the art. The number of operation commands queued in the interface queue is not limited thereto, and more operation commands can be used. This is not specially limited in the present disclosure.

In S204, the memory controller may determine, based on the counted number of continuous write commands, whether the write commands are continuous. When the counted number of continuous write commands is greater than the preset value, it is determined that the write commands are continuous, and the bypass write mode is entered (that is, S120). When the counted number of continuous write commands is less than or equal to the preset value, it is determined that the write commands are not continuous, and a normal write mode is entered (that is, S212).

Here, when the number of continuous write commands is relatively small, if the bypass write mode is entered, when receiving another operation command (for example, a read command) from the host following the continuous write commands, the memory controller needs to first exit the bypass write mode before switching to an operation mode indicated by the other operation command. This requires the occupation of overhead for the memory controller to execute firmware, and frequent switching between operation modes causes a further increase in overhead during the execution of the firmware.

In a specific example, a first preset value may be 3072. In another implementation, the first preset value may be another positive integer. During actual application, a person skilled in the art may appropriately set the first preset value according to a type of a memory. The first preset value is not specially limited in the implementations of the present disclosure.

In the implementations of the present disclosure, it is set that when the number of the write commands for the memory is greater than the preset value, it is determined that the write commands are continuous, and the memory controller enters the bypass write mode. This can reduce the frequency of frequent switching between operation modes, thereby further reducing the overhead for the memory controller to execute firmware.

In some implementations, the foregoing operating method further includes: entering a normal write mode when the first determination result indicates that the write commands are not continuous, wherein, in the normal write mode, the memory controller updates a second mapping relationship between a buffer address and the physical address of the buffered data and the first mapping relationship.

Referring to FIG. 4, when the counted number of continuous write commands is less than or equal to the preset value, it is determined that the write commands are not continuous, and S212 is performed: entering the normal write mode.

In the bypass write mode, the memory controller buffers data from the host to a write buffer. After the buffered data is written into the memory, the firmware updates a mapping relationship (that is, the first mapping relationship) between a logical address and a physical address of buffered data. For example, the P2C no longer updates the logical relationship information between a buffer address and a physical address of written data, and only updates logical relationship information between a buffer address and a physical address of data that was last buffered in the write buffer and has not been written into the memory. That is, in the bypass write mode, the logical relationship information maintained in the P2C is no longer updated in real time.

In the normal write mode, the memory controller buffers data from the host to the write buffer, and updates a mapping relationship (that is, the second mapping relationship) between a buffer address and a physical address of the buffered data. After the buffered data is written into the memory, the firmware updates a mapping relationship (that is, the first mapping relationship) between a logical address and the physical address of the buffered data, and continues to maintain a mapping relationship between a buffer address and a physical address of unwritten data. That is, in the normal write mode, the logical relationship information maintained in the P2C is updated in real time.

In the implementations of the present disclosure, it is determined whether the number of continuous write commands is greater than the preset value, so that it may be determined whether write commands are continuous. That is, the memory controller may dynamically select, according to whether a current write mode is continuous, whether to bypass the update by the P2C. In this way, overhead of the firmware caused by a P2C logical algorithm can be reduced, thereby improving the write performance.

In some implementations, the foregoing operating method further includes: selecting at least one memory block in the memory according to a received write commands; and determining a type of memory cells of the selected memory block, and generating a second determination result; and the foregoing S120 includes: entering the bypass write mode when the first determination result indicates that the write commands are continuous and the second determination result indicates that the memory cells are single-state memory cells.

Referring to FIG. 4, when the counted number of continuous write commands is greater than the preset value, it is determined that the write commands are continuous, and S205 is performed: determining whether memory cells of the selected memory block are single-state memory cells. When it is determined that the memory cells are single-state memory cells, S120 is performed.

The memory includes a plurality of memory blocks. The memory blocks include a plurality of memory cells. The memory cells in the memory include a single-state memory cell (single-level cell, SLC) for storing 1-bit data, a dual-state memory cell (multi-level cell, MLC) for storing 2-bit data, a trinary-state memory cell (trinary-level cell, TLC) for storing 3-bit data, a quad-state memory cell (quad-level cell, QLC) for storing 4-bit data, and a penta-state memory cell (penta-level cell, PLC) for storing 5-bit data.

S205: The memory controller may allocate, according to the received write commands, a memory space (that is, select at least one memory block) for written data indicated by the write commands. When the selected memory block includes single-state memory cells, the bypass write mode is entered.

In an example, the memory is a PLC memory. Some blocks in the PLC memory may be used as at least one of SLC, MLC, TLC or QLC. When the selected memory block is used as SLC, the bypass write mode is entered.

In an example, the memory is a QLC memory. Some blocks in the QLC memory may be used as at least one of SLC, MLC or TLC. When the selected memory block is used as SLC, the bypass write mode is entered.

In an example, the memory is a TLC memory. Some blocks in the TLC memory may be used as at least one of SLC or MLC. When the selected memory block is used as SLC, the bypass write mode is entered.

In an example, the memory is an MLC memory. Some blocks in the MLC memory may be used as SLC. When the selected memory block is used as SLC, the bypass write mode is entered.

It needs to be noted that a dotted box is used for S205, indicating that S205 is optional. For example, when the memory is an SLC memory, S205 may be omitted. That is, when the write commands for the memory are continuous, the bypass write mode is directly entered.

In an example, when the memory controller detects that the current write mode is continuous-write, that is, the number of continuous write commands is greater than the preset value (for example, the number of write commands is greater than 3072) and the selected memory block is SLC, the size of written data exceeds a preset data amount (for example, the size of the written data is greater than 12 MB), the memory controller starts to enable the bypass write mode.

In some implementations, the foregoing operating method further includes: entering the normal write mode when the first determination result indicates that the write commands are continuous and the second determination result indicates that the memory cells are not single-state memory cells.

Referring to FIG. 4, when the counted number of continuous write commands is greater than the preset value, it is determined that the write commands are continuous, and S205 is performed: determining whether memory cells of the selected memory block are single-state memory cells. When it is determined that the memory cells are not single-state memory cells, S212 is performed.

It needs to be noted that compared with the PLC, the QLC, the TLC, and the MLC, in the SLC mode, the overhead of the firmware caused by the P2C logical algorithm is significantly increased. In the implementations of the present disclosure, it is determined whether memory cells are single-state memory cells, so that the memory controller may directly select, according to the type of the selected memory cells, whether to bypass the update by the P2C. In this way, when the selected memory cells are single-state memory cells, the overhead of the firmware caused by the P2C logical algorithm can be reduced, thereby improving the write performance. When the selected memory cells are not single-state memory cells, the frequency of frequent switching between operation modes of the firmware can be reduced, thereby further reducing the overhead for the memory controller to execute firmware.

Referring to FIG. 4, when it is determined that the operation command is not a write command, S206 is performed: determining whether the memory controller is in the bypass write mode. If the memory controller is in the bypass write mode, S207 is performed. If the memory controller is not in the bypass write mode, S211 is performed.

Here, after sending a previous write command to the memory controller, the host continues to send a next operation command to the memory controller. When the next operation command is not a write command and the memory controller is not in the bypass write mode, S211 may be performed. When the next operation command is not a write command and the memory controller is in the bypass write mode, S207 may be performed.

In S211, after written data indicated by the previous write command is written into the memory, the number of write commands may be reset to zero. For example, the number of write commands in the interface queue is reset to zero, thereby reducing a loss of data.

In S207, it may be further determined whether an operation command for the memory is a read command, so that the memory controller may select to stay in the bypass write mode or exit the bypass write mode.

In some implementations, after the bypass write mode is entered, the foregoing operating method further includes: determining a type of an operation command for the memory, and generating a third determination result; and exiting the bypass write mode when the third determination result indicates that the operation command is a read command.

Referring to FIG. 4, when the memory controller is in the bypass write mode, S207 is performed: determining whether the operation command is a read command. If the operation command is a read command, S210 is performed. If the operation command is not a read command, S213 is performed.

Here, after the bypass write mode is entered, the host continues to send an operation command to the memory controller. When the operation command is a read command, the memory controller exits the bypass write mode. When the operation command is not a read command, the memory controller continues to stay in the bypass write mode.

In some implementations, the foregoing operating method further includes: staying in the bypass write mode when the third determination result indicates that the operation command is a synchronization command or a release command. After the bypass write mode is entered, when the host sends a synchronization command or a release command to the memory controller, the bypass write mode may continue to be stayed in.

In some implementations, the synchronization command includes, but is not limited to, a sync command. The sync command is used for instructing to write data buffered in the write buffer into the memory. The release command includes, but is not limited to, an unmapping (unmap) command. The unmap command is used for instructing to erase data stored in a selected memory block in the memory.

In some implementations, before the bypass write mode is exited, the foregoing operating method further includes: writing the buffered data into the memory, and resetting the number of the write commands to zero.

Referring to FIG. 4, when it is determined that the operation command is a read command, S208 and S209 are performed: writing the buffered data into the memory, and resetting the number of the write commands to zero.

In S208, write data indicated by the previous write command may be written into the memory. In S209, the number of write commands is reset to zero. For example, the number of write commands in the interface queue is reset to zero. Next, the bypass write mode is exited, and the read command is executed.

FIG. 5 is a schematic block diagram of an operating process of a memory controller according to an implementation of the present disclosure. Referring to FIG. 5, a host sends write commands and written data for a memory. A host interface of the memory controller performs front-end command processing. Firmware (for example, a flash translation layer) distributes tasks in response to the write commands. When the write commands for the memory are continuous, a bypass write mode A is entered, and a first mapping relationship between a logical address and a physical address of the written data is updated, and the updated first mapping relationship is stored in a first mapping table. When the write commands for the memory are not continuous, a normal write mode B is entered, and a second mapping relationship between a buffer address and the physical address of the written data and the first mapping relationship between the logical address and the physical address of the written data are updated, and the updated second mapping relationship and first mapping relationship are respectively stored in a second mapping table and the first mapping table.

In some implementations, the memory controller may process operation commands from the host, to ensure the integrity and efficient storage of data and control operations of the memory. To execute the operation commands from the host, the memory controller may run firmware. The firmware is a program running in a memory system, and upon power-up, is loaded onto the memory controller (for example, the processor) for running. The firmware may include various function layers. For example, the firmware may include a Flash Translation Layer (FTL). In an example, the firmware may be stored in the memory controller. In another example, the firmware may be stored in the memory.

Based on the foregoing operating method of a memory controller, the implementations of the present disclosure further provide a memory controller. The memory controller is coupled to a memory. The memory controller is configured to: determine whether write commands for the memory are continuous, and generate a first determination result; and enter a bypass write mode when the first determination result indicates that the write commands are continuous, wherein, in the bypass write mode, the memory controller updates a first mapping relationship between a logical address and a physical address of buffered data.

In some implementations, the memory controller is further configured to: select at least one memory block in the memory according to the received write commands; and determine a type of memory cells of the selected memory block, and generate a second determination result; and the memory controller is specifically configured to: enter the bypass write mode when the first determination result indicates that the write commands are continuous and the second determination result indicates that the memory cells are single-state memory cells.

In some implementations, the memory controller is further configured to: enter a normal write mode when the first determination result indicates that the write commands are not continuous, wherein, in the normal write mode, the memory controller updates a second mapping relationship between a buffer address and the physical address of the buffered data and the first mapping relationship.

In some implementations, the memory controller is further configured to: enter the normal write mode when the first determination result indicates that the write commands are continuous and the second determination result indicates that the memory cells are not single-state memory cells.

In some implementations, after the bypass write mode is entered, the memory controller is further configured to: determine a type of an operation command for the memory, and generate a third determination result; and exit the bypass write mode when the third determination result indicates that the operation command is a read command.

In some implementations, before the bypass write mode is exited, the memory controller is further configured to: write the buffered data into the memory, and reset the number of write commands to zero.

In some implementations, the memory controller is further configured to: stay in the bypass write mode when the third determination result indicates that the operation command is a synchronization command or a release command.

In some implementations, the memory controller is specifically configured to: determine that the write commands are continuous when the number of the write commands for the memory is greater than a preset value.

Based on the foregoing memory controller, the implementations of the present disclosure further provide a memory system.

Figure 6:
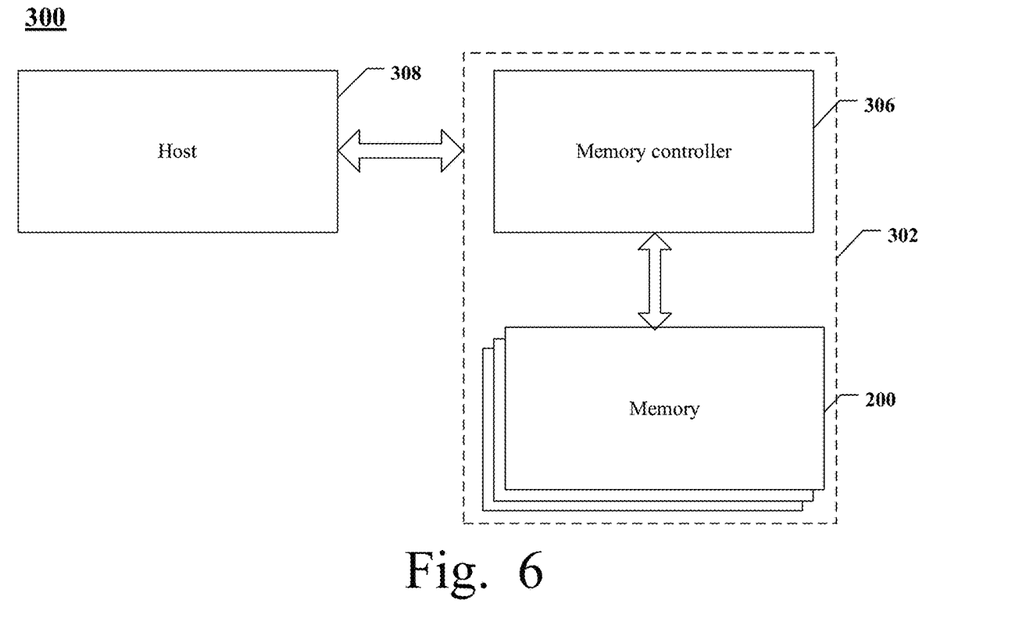
FIG. 6 is a schematic diagram of a memory system according to an implementation of the present disclosure.

FIG. 6 is a schematic diagram of a memory system 300 according to an implementation of the present disclosure. Referring to FIG. 6, the memory system 300 includes:
one or more memories 200; and
the memory controller 306, coupled to the memory 200, and configured to control the memory 200.

The memory system 300 may be a mobile phone, a desktop computer, a laptop computer, a tablet computer, a vehicle computer, a game console, a printer, a pointing device, a wearable electronic device, a smart sensor, a virtual reality (VR) device, an augmented reality (AR) device or any other suitable electronic device with a memory therein.

As shown in FIG. 6, the memory system 300 may include a host 308 and a memory subsystem 302. The memory subsystem 302 has one or more memories 200. The memory subsystem further includes a memory controller 306. The host 308 may be a processor (e.g., a central processing unit (CPU)) or a system on a chip (SoC) (for example, an application processor (AP)) of the electronic device. The host 308 may be configured to send data to the memory 200. Alternatively, the host 308 may be configured to receive data from the memory 200.

The memory 200 may be a NAND flash memory (for example, a three-dimensional (3D) NAND flash memory). The memory 200 may have a reduced leakage current from a driving transistor (for example, a string driver) coupled to an unselect word line during an erase operation. This allows a further size reduction of the driving transistor.

In some implementations, the memory controller 306 is further coupled to the host 308. The memory controller 306 may manage data stored in the memory 200 and communicate with the host 308.

In some implementations, the memory controller 306 is designed for operating in a low duty-cycle environment, for example, secure digital (SD) cards, compact flash (CF) cards, universal serial bus (USB) flash drives, or other media for use in electronic devices such as personal computers, digital cameras, mobile phones, and the like.

In some implementations, the memory controller 306 is designed for operating in a high duty-cycle environment, for example, Solid State Drives (SSDs) or embedded multi-media-cards (eMMCs). The SSDs and eMMCs are used as data storage for mobile devices such as smartphones, tablet computers, laptop computers, etc., and enterprise storage arrays.

The memory controller 306 may be configured to control operations of the memory 200, for example, a read operation, an erase operation, a program operation, and the like. The memory controller 306 may also be configured to manage various functions with respect to the data stored or to be stored in the memory 200 including, but not limited to, bad-block management, garbage collection, logical-to-physical address conversion, wear leveling, etc. In some implementations, the memory controller 306 is further configured to process error correction codes (ECCs) with respect to the data read from the memory 200 or written to the memory 200.

Any other suitable functions may be performed by the memory controller 306 as well, for example, formatting the memory 200. The memory controller 306 may communicate with an external device (e.g., the host 308) according to a particular communication protocol. For example, the memory controller 306 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

The memory controller 306 and the one or more memories 200 may be integrated into various types of memory devices, for example, be included in the same package, such as a universal flash storage (UFS) package or an eMMC package. That is, the memory system 300 may be implemented and packaged into different types of end electronic products.

Figure 7A:
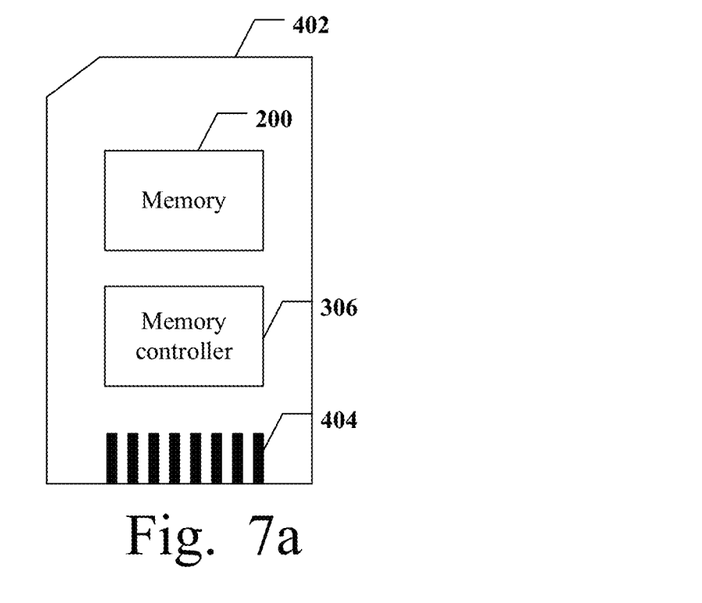
FIG. 7*a* is a schematic diagram of a memory card according to an implementation of the present disclosure.

In one example shown in FIG. 7a, the memory controller 306 and a single memory 200 may be integrated into a memory card 402. The memory card 402 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. The memory card 402 may further include a memory card connector 404 configured to couple the memory card 402 to a host (e.g., the host 308 in FIG. 6).

Figure 7B:
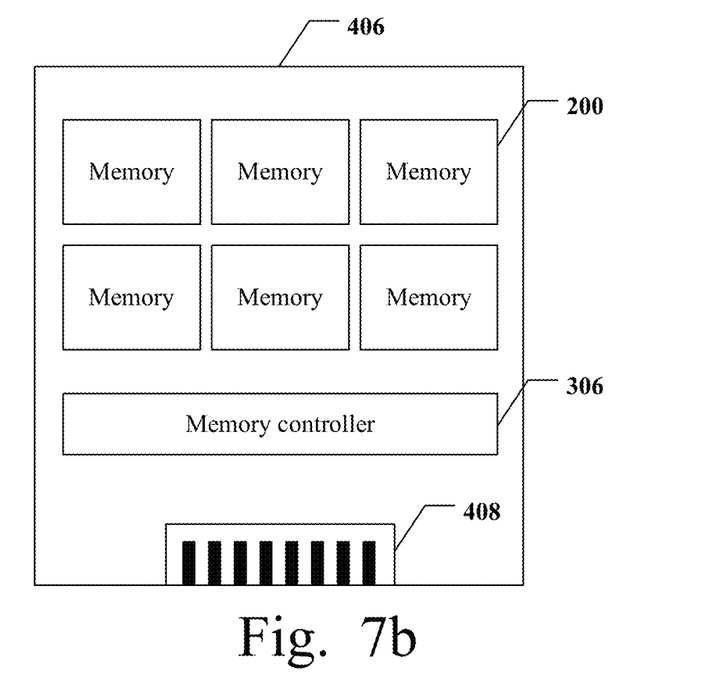
FIG. 7*b* is a schematic diagram of a solid state drive according to an implementation of the present disclosure.

In another example shown in FIG. 7b, the memory controller 306 and the multiple memories 200 may be integrated into a solid state drive (SSD) 406. The solid state drive 406 may further include a solid state drive connector 408 configured to couple the solid state drive 406 to a host (e.g., the host 308 in FIG. 6). In some implementations, the storage capacity and/or the operation speed of the solid state drive 406 is greater than those of the memory card 402.

It may be understood that the memory controller 306 may perform the operating method provided in any implementation of the present disclosure.

An implementation of the present disclosure further provides an electronic device, including: the memory system in any foregoing implementation. The electronic device includes a mobile phone, a desktop computer, a tablet computer, a laptop computer, a server, an in-vehicle device, a wearable device, a power bank, or the like.

According to a first aspect of implementations of the present disclosure, an operating method of a memory controller is provided, characterized in that the memory controller is coupled to a memory, and the operating method includes: determining whether write commands for the memory are continuous, and generating a first determination result; and entering a bypass write mode when the first determination result indicates that the write commands are continuous, where in the bypass write mode, the memory controller updates a first mapping relationship between a logical address and a physical address of buffered data.

The operating method may further include: selecting at least one memory block in the memory according to received write commands; and determining a type of memory cells of the selected memory block, and generating a second determination result; and the entering the bypass write mode when the first determination result indicates that the write commands are continuous comprises entering the bypass write mode when the first determination result indicates that the write commands are continuous and the second determination result indicates that the memory cells are single-state memory cells.

The operating method may further include entering a normal write mode when the first determination result indicates that the write commands are not continuous, wherein, in the normal write mode, the memory controller updates a second mapping relationship between a buffer address and the physical address of the buffered data and the first mapping relationship.

The operating method may further include entering the normal write mode when the first determination result indicates that the write commands are continuous and the second determination result indicates that memory cells are not single-state memory cells.

The operating method may also, after entering the bypass write mode, include: determining a type of an operation command for the memory, and generating a third determination result; and exiting the bypass write mode when the third determination result indicates that the operation command is a read command.

The operating method may also, before exiting the bypass write mode, include: writing the buffered data into the memory, and resetting a number of the write commands to zero.

The operating method may further include staying in the bypass write mode when the third determination result indicates that the operation command is a synchronization command or a release command.

The operating method may determine whether the write commands for the memory are continuous, and generating the first determination result by a method including determining that the write commands are continuous when a number of the write commands for the memory is greater than a preset value.

According to a second aspect of the implementations of the present disclosure, a memory controller is provided. The memory controller is coupled to a memory, and the memory controller is configured to: determine whether write commands for the memory are continuous, and generate a first determination result; and enter a bypass write mode when the first determination result indicates that the write commands are continuous, where in the bypass write mode, the memory controller updates a first mapping relationship between a logical address and a physical address of buffered data.

The memory controller may be further configured to: select at least one memory block in the memory according to received write commands; and determine a type of memory cells of the selected memory block, and generate a second determination result; and the memory controller is configured to: enter the bypass write mode when the first determination result indicates that the write commands are continuous and the second determination result indicates that the memory cells are single-state memory cells.

The memory controller may be further configured to: enter a normal write mode when the first determination result indicates that the write commands are not continuous, wherein, in the normal write mode, the memory controller updates a second mapping relationship between a buffer address and the physical address of the buffered data and the first mapping relationship.

The memory controller may be further configured to: enter the normal write mode when the first determination result indicates that the write commands are continuous and the second determination result indicates that memory cells are not single-state memory cells.

The memory controller may be, after the bypass write mode is entered, further configured to: determine a type of an operation command for the memory, and generate a third determination result; and exit the bypass write mode when the third determination result indicates that the operation command is a read command.

The memory controller may be, before the bypass write mode is exited, further configured to: write the buffered data into the memory, and reset a number of the write commands to zero.

The memory controller may be further configured to: stay in the bypass write mode when the third determination result indicates that the operation command is a synchronization command or a release command.

The memory controller may be further configured to: determine that the write commands are continuous when a number of the write commands for the memory is greater than a preset value.

According to a third aspect of the implementations of the present disclosure, a memory system is provided, including: one or more memories; and the memory controller in the second aspect of the implementations of the present disclosure, coupled to the memory, and configured to control the memory.

The memory system may be further configured to: select at least one memory block in the memory according to received write commands; and determine a type of memory cells of the selected memory block, and generate a second determination result; and the memory controller may be configured to: enter the bypass write mode when the first determination result indicates that the write commands are continuous and the second determination result indicates that the memory cells are single-state memory cells.

The memory system, wherein the memory controller may be further configured to: enter a normal write mode when the first determination result indicates that the write commands are not continuous, wherein, in the normal write mode, the memory controller updates a second mapping relationship between a buffer address and the physical address of the buffered data and the first mapping relationship.

The memory system, wherein the memory controller may be further configured to: enter the normal write mode when the first determination result indicates that the write commands are continuous and a second determination result indicates that memory cells are not single-state memory cells.

According to a fourth aspect of the implementations of the present disclosure, an electronic device is provided, including: the memory system in the second aspect of the implementations of the present disclosure.

In the implementations of the present disclosure, it is determined whether write commands for a memory are continuous, and a determination result is generated. A bypass write mode is entered if the determination result indicates that the write commands are continuous. In the bypass write mode, a memory controller only needs to update a first mapping relationship between a logical address and a physical address of buffered data, and no longer needs to maintain logical relationship information between a buffer address and a physical address of data all the time, that is, no longer needs to update P2C in real time, so that overhead for the memory controller to execute firmware can be reduced, thereby improving write performance.

The foregoing descriptions are merely specific implementations and examples of the present disclosure, but are not intended to limit the protection scope of the present disclosure. Any variation or replacement that may be readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of operating a memory controller to be coupled to a memory, the operating method comprising:
   determining whether write commands for the memory are continuous, and generating a first determination result;
   selecting at least one memory block in the memory according to received write commands;
   determining a type of memory cells of the selected memory block, and generating a second determination result; and
   entering a bypass write mode when the first determination result indicates that the write commands are continuous and the second determination result indicates that the memory cells are single-state memory cells, wherein, in the bypass write mode, the memory controller updates a first mapping relationship between a logical address and a physical address of buffered data.

2. The operating method of claim 1, wherein the operating method further includes entering a normal write mode when the first determination result indicates that the write commands are not continuous, wherein, in the normal write mode, the memory controller updates a second mapping relationship between a buffer address, the physical address of the buffered data, and the first mapping relationship.

3. The operating method of claim 1, wherein the operating method further includes entering a normal write mode when the first determination result indicates that the write commands are continuous and the second determination result indicates that the memory cells are not single-state memory cells.

4. The operating method of claim 1, wherein, after entering the bypass write mode, the operating method further includes:
   determining a type of an operation command for the memory, and generating a third determination result; and
   exiting the bypass write mode when the third determination result indicates that the operation command is a read command.

5. The operating method of claim 4, wherein, before exiting the bypass write mode, the operating method further includes:
   writing the buffered data into the memory; and
   resetting a number of the write commands to zero.

6. The operating method of claim 4, wherein the operating method further includes staying in the bypass write mode when the third determination result indicates that the operation command is a synchronization command or a release command.

7. The operating method of claim 1, wherein the determining whether the write commands for the memory are continuous, and generating the first determination result includes determining that the write commands are continuous when a number of the write commands for the memory is greater than a preset value.

8. A memory controller, wherein the memory controller is coupled to a memory, and the memory controller is configured to:
   determine whether write commands for the memory are continuous, and generate a first determination result;
   select at least one memory block in the memory according to received write commands;
   determine a type of memory cells of the selected memory block, and generate a second determination result; and
   enter a bypass write mode when the first determination result indicates that the write commands are continuous and the second determination result indicates that the memory cells are single-state memory cells, wherein in the bypass write mode, the memory controller updates a first mapping relationship between a logical address and a physical address of buffered data.

9. The memory controller of claim 8, wherein the memory controller is further configured to enter a normal write mode when the first determination result indicates that the write commands are not continuous, wherein, in the normal write mode, the memory controller updates a second mapping relationship between a buffer address, physical address of the buffered data, and the first mapping relationship.

10. The memory controller of claim 8, wherein the memory controller is further configured to enter a normal write mode when the first determination result indicates that the write commands are continuous and the second determination result indicates that the memory cells are not single-state memory cells.

11. The memory controller of claim 8, wherein, after the bypass write mode is entered, the memory controller is further configured to:
   determine a type of an operation command for the memory, and generate a third determination result; and
   exit the bypass write mode when the third determination result indicates that the operation command is a read command.

12. The memory controller of claim 11, wherein, before the bypass write mode is exited, the memory controller is further configured to:
   write the buffered data into the memory; and
   reset a number of the write commands to zero.

13. The memory controller of claim 11, wherein the memory controller is further configured to stay in the bypass write mode when the third determination result indicates that the operation command is a synchronization command or a release command.

14. The memory controller of claim 8, wherein the memory controller is specifically configured to determine that the write commands are continuous when a number of the write commands for the memory is greater than a preset value.

15. A memory system comprising:
a memory; and
a memory controller, the memory controller configured to:
determine whether write commands for the memory are continuous, and generate a first determination result;
select at least one memory block in the memory according to received write commands;
determine a type of memory cells of the selected memory block, and generate a second determination result; and
enter a bypass write mode when the first determination result indicates that the write commands are continuous and the second determination result indicates that the memory cells are single-state memory cells, wherein in the bypass write mode, the memory controller updates a first mapping relationship between a logical address and a physical address of buffered data.

16. The memory system of claim 15, wherein the memory controller is further configured to enter a normal write mode when the first determination result indicates that the write commands are not continuous, wherein, in the normal write mode, the memory controller updates a second mapping relationship between a buffer address, the physical address of the buffered data, and the first mapping relationship.

17. The memory system of claim 15, wherein the memory controller is further configured to enter a normal write mode when the first determination result indicates that the write commands are continuous and the second determination result indicates that the memory cells are not single-state memory cells.

18. The memory system of claim 15, wherein, after the bypass write mode is entered, the memory controller is further configured to:
determine a type of an operation command for the memory, and generate a third determination result; and
exit the bypass write mode when the third determination result indicates that the operation command is a read command.

19. The memory system of claim 18, wherein, before the bypass write mode is exited, the memory controller is further configured to:
write the buffered data into the memory; and
reset a number of the write commands to zero.

20. The memory system of claim 18, wherein the memory controller is further configured to stay in the bypass write mode when the third determination result indicates that the operation command is a synchronization command or a release command.

* * * * *